US009744574B2

(12) United States Patent
Cathcart

(10) Patent No.: US 9,744,574 B2
(45) Date of Patent: Aug. 29, 2017

(54) METHOD AND APPARATUS FOR TREATING KITCHEN WASTE AND A KITCHEN WASTE PRODUCT

(75) Inventor: Jeremy Cathcart, Worthing (GB)

(73) Assignee: Voro Limited, London (GB)

( * ) Notice: Subject to any disclaimer, the term of this patent is extended or adjusted under 35 U.S.C. 154(b) by 1092 days.

(21) Appl. No.: 13/881,622

(22) PCT Filed: Oct. 26, 2011

(86) PCT No.: PCT/EP2011/068793
§ 371 (c)(1),
(2), (4) Date: Jul. 1, 2013

(87) PCT Pub. No.: WO2012/055931
PCT Pub. Date: May 3, 2012

(65) Prior Publication Data
US 2013/0319262 A1    Dec. 5, 2013

(30) Foreign Application Priority Data

Oct. 27, 2010 (GB) .................................. 1018150.1
Aug. 4, 2011 (GB) .................................. 1113457.4

(51) Int. Cl.
B30B 9/02    (2006.01)
B30B 9/12    (2006.01)
(Continued)

(52) U.S. Cl.
CPC ................ B09B 3/00 (2013.01); B01F 7/08 (2013.01); B01F 7/18 (2013.01); B03B 9/06 (2013.01);
(Continued)

(58) Field of Classification Search
CPC .. B30B 9/02; B30B 9/12; B30B 9/127; B30B 9/16; B30B 9/163; B01F 7/08; B01F 7/18;
(Continued)

(56) References Cited

U.S. PATENT DOCUMENTS 4,036,426 A     7/1977  Little
4,871,449 A *  10/1989  Lott .................... B01D 21/0012
                                                          100/112

(Continued)

FOREIGN PATENT DOCUMENTS

DE          250925 A1    10/1987
DE        19925244 A1    12/2000
(Continued)

OTHER PUBLICATIONS

Combined Search and Examination Report for Application No. GB 1410696.7 dated Aug. 1, 2014.
(Continued)

Primary Examiner — Jimmy T Nguyen
(74) Attorney, Agent, or Firm — Lerner, David, Littenberg, Krumholz & Mentlik, LLP

(57) ABSTRACT

Apparatus for processing kitchen waste is disclosed. In some embodiments, the apparatus comprises an inlet for receiving the kitchen waste, a comminuter to comminute the received waste, a dewatering device to dewater the comminuted waste, a compressor to compress the dewatered comminuted waste, and an outlet to provide processed waste ready for collection, wherein the inlet has a lid moveable between a closed position and an open position and the inlet communicates with a hopper having an outlet, the hopper outlet communicating with the comminuter by a door mechanism, and wherein the door mechanism and the lid are interlocked such that the door mechanism opens to supply food waste to (Continued)

the comminuter only when the lid is in the closed position and such that the lid is openable to allow a user to add food waste into the hopper only when the door mechanism is closed.

9 Claims, 7 Drawing Sheets

(51) Int. Cl.
 *B09B 3/00*   (2006.01)
 *B03B 9/06*   (2006.01)
 *B01F 7/08*   (2006.01)
 *B01F 7/18*   (2006.01)
 *C04B 18/02*   (2006.01)
 *B01F 7/00*   (2006.01)
 *C04B 111/00*   (2006.01)

(52) U.S. Cl.
 CPC ............ *B09B 3/0041* (2013.01); *B30B 9/02* (2013.01); *B30B 9/12* (2013.01); *B30B 9/127* (2013.01); *C04B 18/021* (2013.01); *B01F 7/00275* (2013.01); *C04B 2111/00775* (2013.01); *Y02W 30/91* (2015.05)

(58) Field of Classification Search
 CPC ..... B01F 7/00275; B09B 3/0041; B09B 3/00; C04B 18/021; C04B 14/26; C04B 18/30; C04B 24/2676; C04B 2111/00775; Y02W 30/91
 USPC .......................................................... 100/117
 See application file for complete search history.

(56) References Cited

U.S. PATENT DOCUMENTS

| | | | |
|---|---|---|---|
| 4,919,722 A | 4/1990 | Trivino Vazquez et al. | |
| 5,302,331 A | 4/1994 | Jenkins | |
| 5,743,178 A * | 4/1998 | Babbini | B30B 9/16 100/127 |
| 6,279,471 B1 * | 8/2001 | Reddoch | B30B 9/12 100/106 |
| 2002/0069791 A1 | 6/2002 | Merkley et al. | |
| 2003/0006327 A1 * | 1/2003 | Ryu | B02C 18/0084 241/159 |
| 2005/0126430 A1 | 6/2005 | Lightner et al. | |

FOREIGN PATENT DOCUMENTS

| | | |
|---|---|---|
| EP | 0103195 A1 | 3/1984 |
| EP | 0427899 A1 | 5/1991 |
| EP | 0930280 A1 | 7/1999 |
| EP | 1797970 A2 | 6/2007 |
| FR | 2633277 A1 | 12/1989 |
| FR | 2869310 A1 | 10/2005 |
| JP | 50-115363 | 9/1975 |
| JP | 59-180741 | 10/1984 |
| JP | H01107882 A | 4/1989 |
| JP | H04219356 A | 8/1992 |
| JP | H0596269 A | 4/1993 |
| JP | 09-239342 | 9/1997 |
| JP | 10-085713 | 4/1998 |
| JP | 2000001381 A | 1/2000 |
| JP | 2000-061425 A | 2/2000 |
| JP | 2000168906 A | 6/2000 |
| JP | 2001180993 A | 7/2001 |
| JP | 2002018397 A | 1/2002 |
| JP | 2003136100 A | 5/2003 |
| JP | 2003-225516 A | 8/2003 |
| JP | 2005-152798 A | 6/2005 |
| JP | 2005161369 A | 6/2005 |
| JP | 2007-516077 A | 6/2007 |
| KR | 100204249 | 3/1999 |
| KR | 20030022829 A | 3/2003 |
| KR | 20050019063 | 2/2005 |
| KR | 20060008516 A | 1/2006 |
| KR | 100669110 B1 | 1/2007 |
| KR | 20070001333 A | 1/2007 |
| KR | 100731762 B1 | 6/2007 |
| KR | 100739863 B1 | 7/2007 |
| KR | 100753852 B1 | 8/2007 |
| KR | 20070082135 A | 8/2007 |
| KR | 20080003598 A | 1/2008 |
| KR | 100881426 B1 | 3/2008 |
| KR | 100817607 B1 | 3/2008 |
| KR | 100841516 B1 | 6/2008 |
| KR | 100853856 B1 | 8/2008 |
| KR | 100865831 B1 | 10/2008 |
| KR | 20090037110 A | 4/2009 |
| KR | 20090075916 A | 7/2009 |
| KR | 100964282 B1 | 6/2010 |
| KR | 20100107886 A | 10/2010 |
| RU | 2212287 C1 | 9/2003 |
| SU | 1511232 A1 | 9/1989 |
| WO | 0232830 A2 | 4/2002 |
| WO | 2004037740 A1 | 5/2004 |
| WO | 2005061134 A1 | 7/2005 |
| WO | 2006120353 A2 | 11/2006 |

OTHER PUBLICATIONS

Examination Report for Application No. GB 1113457.4 dated Aug. 1, 2014.
British Examination Report and Search Report for Application No. B1113457 dated Sep. 26, 2011.
British Examination Report for Application No. GB1113457 dated May 10, 2013.
British Search Report for Application No. GB1018150 dated Feb. 28, 2011.
International Search Report for Application No. PCT/EP2011/068793 dated Jul. 9, 2012.

* cited by examiner

METHOD AND APPARATUS FOR TREATING KITCHEN WASTE AND A KITCHEN WASTE PRODUCT

CROSS-REFERENCE TO RELATED APPLICATIONS

The present application is a national phase entry under 35 U.S.C. §371 of International Application No. PCT/EP2011/068793, filed Oct. 26, 2011, published in English, which claims priority from GB Application No. 1018150.1, filed Oct. 27, 2010, and GB Application No. 1113457.4, filed Aug. 4, 2011, all of which are incorporated herein by reference.

FIELD OF THE INVENTION

The present invention relates to a method of and apparatus for treating waste, in particular food waste, for example in a domestic kitchen or in an industrial or commercial kitchen or restaurant. Such food waste may be cooked or uncooked food and could be for example leftovers from cooked meals, food left on plates, or waste from food preparation.

BACKGROUND

The collection and disposal of kitchen waste poses an increasing problem. Such waste is commonly periodically collected by local refuse services and is disposed of by incineration or landfill.

Various proposals have been made for handling collected waste. As an example, U.S. Pat. No. 5,302,331 describes a process in which a wide range of collected waste materials including leftover foodstuffs are pulverised using a hammer mill comprising a rotatable drum and steel blades rotating within the drum. The powdered garbage is then removed from the drum and transferred to a mixing container where it is slurried by adding water. Bacterial growth is inhibited by adding a biological fixing agent such as lime, grout, wood putty, adhesives, gypsum, or Portland cement, e.g. a mixture of lime, Portland cement and sand. The slurried mixture may be cast in moulds to set as blocks.

Whatever processing may be carried out after collection, whilst awaiting collection, the unprocessed waste is liable to attract vermin and to degrade producing unpleasant odours and potentially a health hazard.

BRIEF SUMMARY OF THE INVENTION

Embodiments of the present invention provide for the processing of kitchen or restaurant waste, in particular food waste, in situ at the location of the kitchen or restaurant.

Embodiments of the present invention provide for the processing of kitchen waste on a scale convenient for use by a householder or a small commercial establishment such as a restaurant or hotel so enabling them to treat their own waste and removing the need to store untreated waste for collection.

Embodiments of the invention provide a method of processing kitchen or food waste, the method comprising processing the waste at the premises at which it was generated using apparatus that comminutes received waste to provide comminuted waste, dewaters the comminuted waste to provide dewatered waste, compresses the dewatered comminuted waste and provides processed waste which comprises spongy granulate material, for storage, collection or other disposal.

Optionally the method further comprises the apparatus mixing the compressed waste with a powder to inhibit bacterial infection prior to providing the processed waste.

In an embodiment, a method further comprises collecting processed waste from a plurality of premises and disposing of the collected processed waste.

Disposing may comprise transporting the processed waste to a processing facility. As another possibility, the processed waste may be transported to a waste disposal location for disposal, for example as landfill.

An embodiment of the invention provides a method for treating kitchen waste to stabilise the waste, pending collection, in the form of waste granules, comprising comminuting the waste to provide comminuted waste, dewatering the comminuted waste to provide dewatered waste, compressing the dewatered waste to produce compressed waste, and mixing the compressed waste with a powder, for example cementitious powder, to form waste granules.

Embodiments of the present invention provide processed waste that is stable, rot free, essentially odour free and not attractive to or edible by pests such as rats. As such, the processed waste does not need to be collected frequently. Thus, waste collections can be decreased in frequency down to any desired level, for instance to once every four weeks.

Embodiments of the present invention provide apparatus for receiving domestic or catering industry kitchen waste comprising food waste and converting the same to a dry, rot resistant, granular form. The granular product is stable, dry and easily storable to await collection and subsequent disposal by a collecting authority.

Embodiments of the present invention provide apparatus for batch processing kitchen waste comprising food waste, the apparatus comprising an inlet for receiving food waste, a comminuter or comminution device to comminute received waste to provide comminuted waste, a dewaterer or dewatering device to dewater comminuted waste to provide dewatered waste, and a compressor to compress the dewatered waste to produce compressed waste. Optionally a delivery device may be provided to deliver powder to be mixed with the compressed waste by a mixer to form waste granules.

The waste inlet may communicate with a hopper having an outlet communicating with the comminuter by a door mechanism. The inlet may have a lid moveable between a closed position and an open position and the door mechanism and the lid may be interlocked such that the door mechanism opens to release food waste to pass out of the door mechanism to reach the comminuter only when the lid is in the closed position and such that the lid is openable to allow a user to add food waste into the hopper only when the door mechanism is closed.

The comminuter may comprise at least a pair of contra-rotatable driven knife or blade bearing shafts defining a nip through which the waste is forced. The effect of the chopping/slicing action of the knives may be to reduce the waste to particles of not more than 4 mm in their largest dimension, preferably not more than 2 mm.

In an embodiment, a receiving chamber is provided to receive comminuted waste and to transfer the comminuted waste to the dewaterer. The receiving chamber may have a driven stirring member for stirring the comminuted waste and displacing the waste into the dewaterer.

The driven stirring member may be shaped to urge comminuted waste to enter the dewaterer or dewatering device. As an example, the driven stirring member may have blades having a chord which is inclined to the horizontal with the leading edge of each blade being above its trailing edge.

The dewaterer may comprise an Archimedean screw in a screw housing, the screw housing having an inlet for comminuted waste at a upstream location and an outlet for dewatered waste at a downstream location, and ports or apertures along the length of the housing between the inlet and the outlet allowing water egress therefrom. The pitch, outer diameter and core diameter of this screw may each be constant, so that the waste is not substantially compressed at this point. Optionally the pitch may decrease progressively or the diameter of the core may increase progressively to impose a greater degree of compression, although the main purpose of this stage is dewatering rather than compression.

The compressor may comprise an Archimedean screw having a screw flight helically arranged over a core having a diameter that increases, in an example progressively expands, from an inlet end to an outlet end of the screw. As another possibility or additionally, the Archimedean screw may have a screw pitch decreasing from the inlet end to the outlet end, although decreasing the screw pitch may reduce the ability of the screw to convey material. The pressure applied during the compression process and the heat generated by friction during the compression process assist the drying of the material being processed and may contribute to sterilising the waste by killing bacteria. If desired, a heat source could be provided to assist drying.

The compressor may have a housing comprising two hinged shells to provide access for cleaning by cleaning fluid and perhaps also to allow for relief of excess pressure caused by an incompressible object inadvertently passing through this part of the machine.

In an embodiment, the dewaterer comprises a dewatering Archimedean screw running in a screw housing having a screw flight around a cylindrical core, the compressor comprises a compressing Archimedean screw having a screw flight around a core, where the two cores are longitudinally connected one to the other or are unitary or integral.

In an embodiment, the apparatus comprises a hopper to contain an agent to aid the drying of the material being processed and a feed mechanism for dispensing the drying agent from the hopper for mixing with the compressed waste.

The agent will generally be a powder or fine granular material and may be any material that is acceptable from health and safety and environmental grounds, that is a material suitable for processing within the apparatus and that facilitates drying of the waste material being processed to produce granular or particulate processed output that can, for example, be stored for a number of weeks awaiting collection.

In an example, the agent may be or comprise a material, such as lime or cement that, when mixed with the material being processed may, dependent upon the moisture content of the material being processed, cause an exothermic reaction, generating heat which may assist the drying of the material being processed. Any suitable form of cement may be used.

The agent may comprise or contain a grinding agent that assists the mixing process and may assist the production of a granular or particulate processed waste output. Examples of grinding agents are relatively hard relatively chemically inert particulate materials such as crushed silica, crushed stone and/or sand.

The agent may comprise or contain a binding agent to assist the production of a granular or particulate processed waste output.

In an example, the agent may comprise at least one of a cement, for example Portland cement, quick lime and finely divided silica or a hydraulic mortar mix.

In an example, the agent may be a hydraulic mortar mix that may comprise silica (which may be crystalline silica, e.g. crushed stone), hydrated lime ($CaOH_2$), and calcium magnesium carbonate (e.g. Dolomite), optionally with some polymer latex such as styrene butadiene latex.

In an example, the agent may be or may comprise, by weight %, crushed quartz 60%, hydrated lime 30%, SBR latex 5%, and Dolomite 5%.

As another possibility, the agent may contain a cement, in an example Portland cement. It may further contain quick lime. It may further comprise fine aggregate such as fine sand, suitably fine silica sand.

One suitable, Portland cement based, cementitious powder is glass block mortar (GBM). A typical GBM contains, by weight %, 50-65% crystalline silica, 20-32% Portland cement, 0-5% latex polymer, 0-5% dolomite (or other calcium carbonate, magnesium carbonate or a mixture thereof) and 0-1% detergent, e.g. sodium naphthalene sulfonate. Suitably the latex polymer is vinyl acetate, SBR (styrene-butadiene) or acrylate.

A fungicide may be added at an appropriate stage in the processing of the waste material. The drying agent may optionally comprise a fungicide which may be added as a dry powder, for example added with or as part of the drying agent, or liquid fungicide which could be added to the original waste or at another stage prior to addition to the drying agent. Copper sulphate (or other copper salt) is a preferred fungicide, to be used as a dry powder or, less preferably, in solution. Other possible fungicides include wood preservatives.

Where the drying agent is used, then in an embodiment an aim is for the dewaterer to output material having a water content suitable to the amount of drying agent to be used such that suitably dry granules will be produced at the end of the process.

The mixer may comprise a mixing chamber containing at least one rotatable blade member.

The apparatus may include functionality to execute a cleaning cycle, which, in response to initiation of a cleaning cycle, causes cleaning liquid to be passed through one or more of the dewaterer, the compressor and the comminuter, and spent cleaning fluid to be discharged via an outlet drain orifice.

The dewaterer and compressor may comprise screw conveyors that may be run in a reverse direction during a cleaning cycle.

The apparatus may comprise one or more sensors to enable automatic initiation of a cleaning cycle when the presence of waste in the apparatus is no longer detected after waste has been processed.

A valve may be provided between an outlet of the compressor and the mixer which valve is moveable between an open position wherein the outlet communicates with the mixing chamber and a closed position wherein the outlet is closed off from the mixing chamber. Isolation of the mixer from the upstream parts of the path taken by the waste enables those parts to be washed whilst the mixer is kept dry.

BRIEF DESCRIPTION OF DRAWINGS

Embodiments of the invention will now be described by way of example with reference to the accompanying drawings, in which.

DETAILED DESCRIPTION

Figure 1:
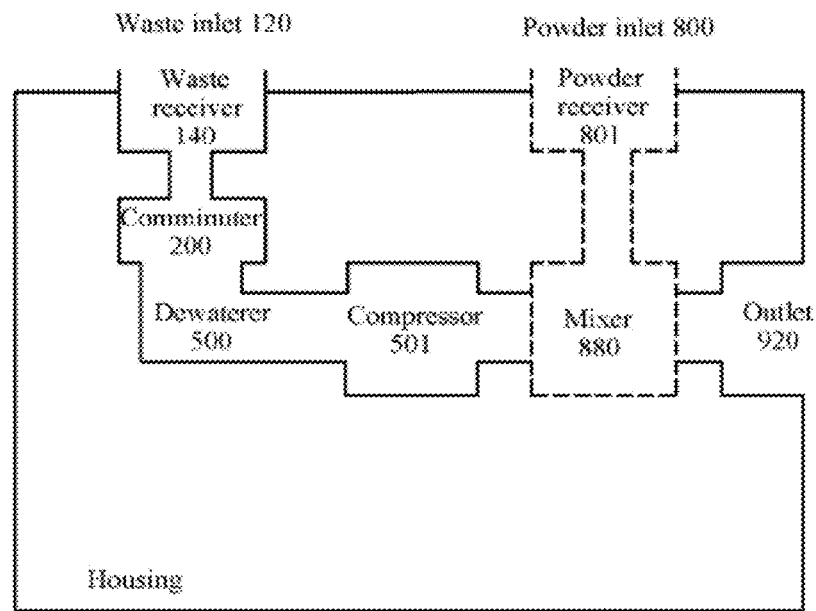
FIG. 1 shows a functional block diagram of apparatus embodying the invention.

Referring now to the drawings, FIG. 1 shows a functional block diagram of an example of apparatus embodying the invention.

The apparatus is of a size suitable for placement within a domestic, industrial or commercial kitchen. Where the apparatus is designed to handle domestic food waste then it may be 300 mm (millimeters) wide and 500 mm deep and designed to fit under a normal kitchen worktop. As another possibility, the apparatus may be of a size similar to a dishwasher or washing machine (for example having a 500 mm by 500 mm or 600 mm by 600 mm footprint). When the apparatus is for use in an industrial or commercial setting then it may be larger.

As shown in FIG. 1, the apparatus has a housing 10 having a waste inlet 120 to allow a user to charge a waste receiver 140 mounted within the housing with kitchen waste, in particular food waste, for example left over cooked or uncooked food, cooked or uncooked food remaining on plates and food scraps or peelings produced during food preparation.

The waste receiver 140 is coupled to supply received waste to a comminuter 200 to produce comminuted waste. The comminuter 200 is coupled to supply comminuted waste to a dewaterer 500. The dewaterer 500 is coupled to output dewatered waste material to a compressor 501 that is provided to compress the dewatered comminuted waste and to supply compressed dewatered comminuted waste. The compressed dewatered comminuted waste may be supplied directly to an outlet 920 of the apparatus.

The apparatus has a powder receiver 801 coupled to receive a drying agent, generally a powder, from a powder inlet 800 and to supply the drying agent to a mixer 880 provided to mix the compressed dewatered comminuted with powder prior to output. The purpose of the drying agent is to enhance the dryness and thus the lifespan of the resultant processed waste product, enabling it to be stored for collection.

It will of course be appreciated that FIG. 1 is intended simply to represent the functionality provided and the functional components shown in FIG. 1 need not necessarily in reality be separate components. As an example the dewaterer and compressor may be provided by the same component.

Figure 2:
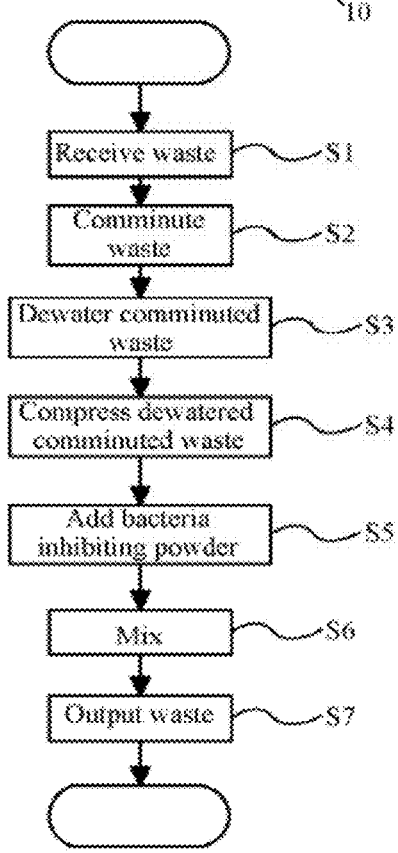
FIG. 2 shows a flow chart illustrating a process embodying the invention.

In operation as illustrated by FIG. 2, a user places food waste (as explained above) into the waste receiver 140 (S1). The waste may be stored there temporarily, with further waste being added from time to time. The user also charges the powder receiver 801 with the drying agent.

When the apparatus is activated by the user, food waste is supplied from the waste receiver 140 to the comminuter 200 and the comminuter is driven to chop, shred and grind the food waste to particles or granules with a size and consistency similar to that of bread crumbs (S2). The comminuter may comprise one or more shredding blades.

The comminuted waste passes to the dewaterer 500 where it is dewatered and somewhat compressed (S3) before being transferred to the compressor 501 (S4). The dewaterer 500 may be designed so that for example, depending upon the original water content, 50-70% of the weight of the waste is removed as liquid water. The compressor may be designed to put the waste under high pressure, for example in the range 5 MPa-35 MPa or higher, for example 400 MPa and may subject it to frictional heating, resulting in a temperature rise which may be, for example, 7-10 degrees Celsius, depending upon the food waste being processed. The waste may be heated (for example by heat exchange with a hot water supply). In an example the dewaterer and compressor may be provided by respective sections of a screw conveyor with, at least in the high pressure section, the diameter of the core increasing and/or the pitch of the conveyor screw decreasing, for example continuously, toward its rearward end, that is in the direction in which the waste is being transferred, so as to compress the waste as it is transported by the screw conveyor.

The comminuted, dewatered and compressed waste may now have a paste-like consistency and a water content of typically about 30%, preferably 25%, by weight.

Where provided, the agent will generally be a powder or fine granular material and may be any material that is acceptable from health and safety and environmental grounds, that is suitable for processing within the apparatus and that facilitates drying of the waste material being processed to produce granular or particulate processed output that can, for example, be stored for a number of weeks awaiting collection.

Where a powder is supplied, the powder from the powder receiver 801 and compressed dewatered comminuted waste output from the compressor are mixed by the mixer (S6) and supplied to the output (S7). In an example, the powder may be supplied to provide a ratio, by volume percent, of 25 to 35% waste to powder, depending upon the food type. For a domestic apparatus, the powder receiver may hold about 1 Kg (Kilogramme) of drying agent, which may be sufficient to process an average family's food waste for one week. The mixer also acts further to slice or shred the waste material.

In an example, the agent may be or comprise a material, such as lime or cement that, when mixed with the waste being processed may, dependent upon the moisture content of the waste being processed, cause an exothermic reaction, generating heat which may assist the drying of the waste being processed. Any suitable form of cement may be used.

The agent may comprise or contain a grinding agent that assists the mixing process and may assist the production of a granular or particulate processed waste output. Examples of grinding agents are relatively hard, relatively chemically inert particulate materials such as at least one of crushed silica, crushed stone and sand. The agent may comprise or contain a binding agent to assist the production of a granular or particulate processed waste output.

As an example the powder may be an alkaline or lime-based powder such as for example a cementitious powder, quick lime, a hydraulic mortar mix. An example of a hydraulic mortar mix may comprise silica (which may be crystalline silica, e.g. crushed stone), hydrated lime ($CaOH_2$), and calcium magnesium carbonate (e.g. Dolomite), optionally with some polymer latex such as styrene butadiene latex. In a specific example the hydraulic mortar may comprise, by weight %, crushed quartz 60%, hydrated lime 30%, SBR latex 5%, and Dolomite 5%.

In an example a cementitious powder may comprise Portland cement. A cementitious powder may also contain one or both of quick lime and a fine aggregate such as fine sand, suitably fine silica sand.

An example of a suitable Portland cement based cementitious powder is glass block mortar (GBM). A typical GBM contains, by weight %, 50-65% crystalline silica, 20-32% Portland cement, 0-5% latex polymer, 0-5% dolomite (or other calcium carbonate, magnesium carbonate or a mixture thereof) and 0-1% detergent, e.g. sodium naphthalene sulfonate. The latex polymer may be vinyl acetate, SBR (styrene-butadiene) or acrylate.

After mixing, the waste and powder will have formed processed waste output comprising particles of around 1-2 mm in size which are quite dry and so form a flowable coarse powder which is provided to the outlet 920. Where the powder comprises a cement and/or quicklime, the chemical reaction between the powder and the damp food waste generates heat which accelerates the drying time, compacting increasing with temperature, resulting in a particulate material which progressively sets or hardens (akin to cement "going off") to produce the flowable coarse powder.

The outlet 920 may comprise a chute 94 and may deliver the flowable coarse powder into a bag, suitably of paper or other biodegradable material, or other receptacle. For domestic use, the bag may be of similar size to a vacuum cleaner bag.

The processed waste output by the apparatus may be set aside for future disposal as it is quite odourless and unaffected by becoming wet. The processed waste can therefore be stored without difficulty to await collection.

A fungicide may be added at an appropriate stage in the processing of the waste material. The agent may optionally comprise a fungicide, which may be added as a dry powder, for example added with or as part of the drying agent, or a liquid fungicide could be added to the original waste or at another stage prior to addition to the drying agent. Copper sulphate (or other copper salt) is a preferred fungicide, to be used as a dry powder or, less preferably, in solution. Other possible fungicides include wood preservatives.

Figure 3:
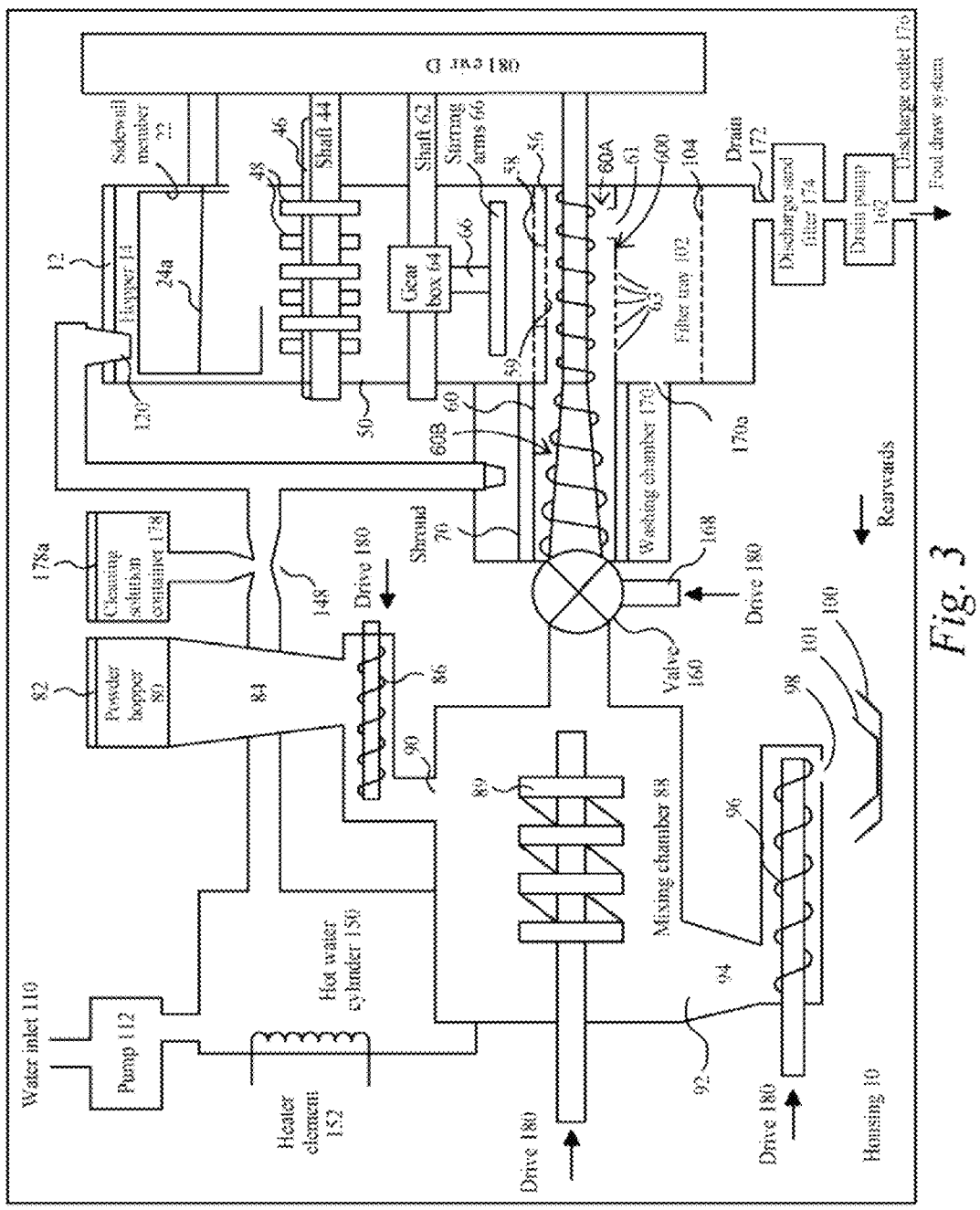
FIG. 3 shows a functional diagram of one example of apparatus embodying the invention.

An example of a food waste treatment apparatus according to the invention will now be described with reference to FIGS. 3, 4 and 5, in which FIG. 3 shows a functional diagram illustrating examples of the various functional components of the apparatus, how they cooperate and how the various materials pass through the apparatus. In this example, the apparatus is designed to receive food waste and to process it through six stages to produce as a final product a dry granular material.

Waste Reception

In this example, the waste inlet is in the form of a user-openable door 12 of the housing 10. The door 12 may be for instance hinged or slideable for opening. Door 12 gives access to the waste receiver which in this example is a hopper 14.

The hopper 14 has hinged or pivotable wall members 22 (only one being visible in FIG. 3) that are movable between a closed position in which the hopper retains waste and an open position in which the hopper discharges waste to the comminuter.

The pivotable side wall members 22 are pivotable about axes 24a by any appropriate mechanism (not shown), in this example by means of a crank mechanism, coupled to a drive mechanism 180 (see below) of the apparatus.

The sidewall members 22 of the hopper 14 are thus moveable between a first, downwardly closed, position and a second, downwardly open, position. Thus when the side wall members 22 are in the second downwardly open position waste product is released from the hopper into the comminuter whilst when the side wall members 22 are in the first downwardly closed position waste, the wall members press down on food waste that is below them to facilitate comminution.

An interlock mechanism (not shown) ensures that the lid or door 12 is locked before the hopper 14 is opened to discharge waste into the comminuter or comminution device.

Comminution Device

In this example the comminuter or comminution device has two parallel, contra-rotating shafts 44 and 46 below the hopper side wall members 22. Each shaft 44, 46 bears a stack of bladed wheels 48 configured to rotate with their shaft 44, 46. For example, the bladed wheels 48 may be keyed for rotation with their respective shaft 44, 46. As another possibility, the shafts 44 may have a non-circular cross-section, e.g. octagonal. The wheels 48 of the two shafts 44 and 46 are intermeshed and rotate so as to draw waste down between the shafts 44 and 46. Each bladed wheel 48 bears knife teeth (for example eight) which may, as an example, be shaped such that the distal end of each tooth lies rotationally behind the radius bisecting the root of the tooth, the leading edge of the tooth being convexly curved for a scything action through the food waste. The contra-rotatable shafts 44 and 46 define a nip through which in operation the waste is forced. The effect of the chopping/slicing action of the knives may be to reduce the waste to particles of not more than 4 mm in their largest dimension, preferably not more than 2 mm.

In this example, a receiving chamber 50 is provided below the bladed wheels 48 to receive comminuted waste and to transfer the comminuted waste to the dewaterer. The receiving chamber may have a driven stirring member for stirring the comminuted waste and displacing the waste into the dewaterer.

Figure 4:
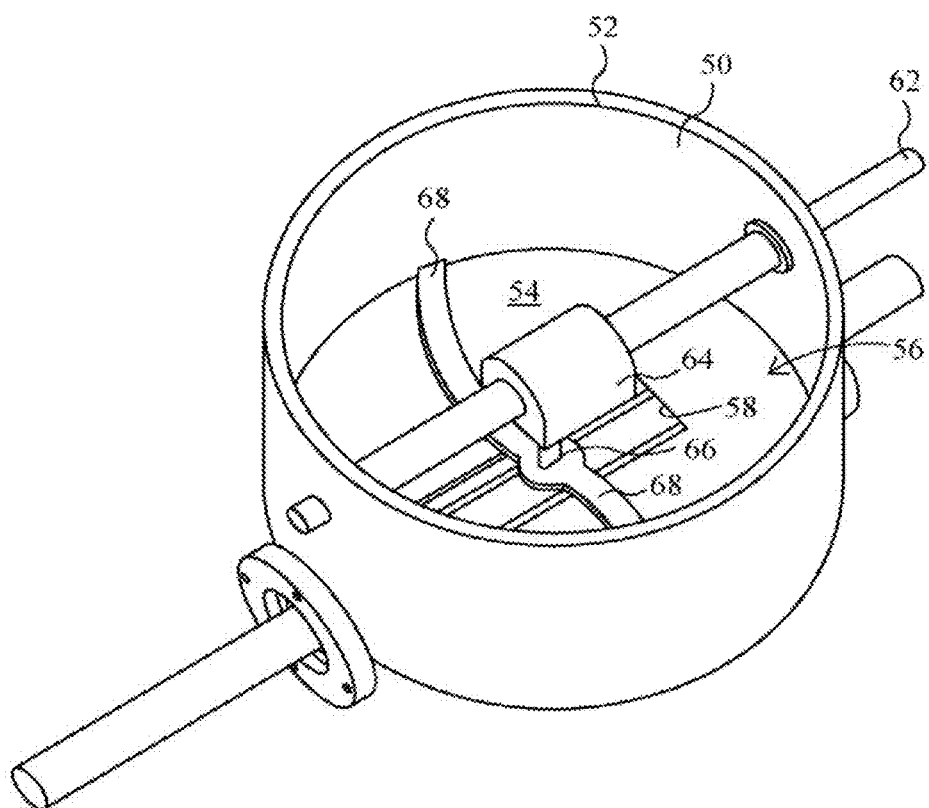
FIG. 4 shows a perspective view of an example of a receiving chamber of apparatus embodying the invention.
Figure 5:
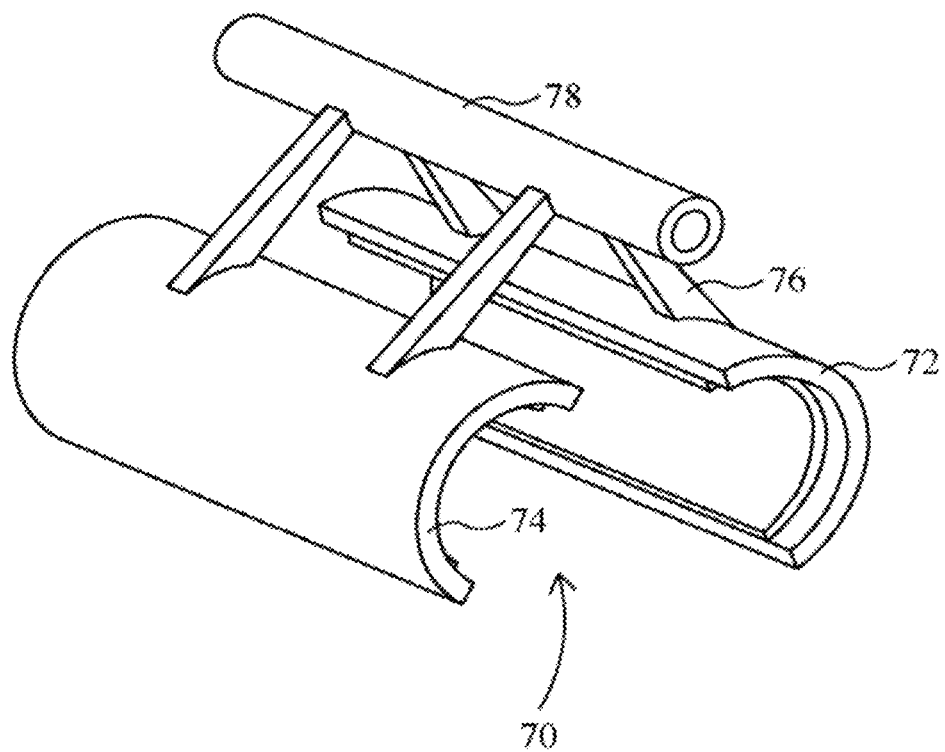
FIG. 5 shows a perspective view, in an open position, of a shroud of a screw conveyor of a compressor of an apparatus embodying the invention.

FIG. 4 illustrates an example of the receiving chamber 50. In the example shown in FIG. 4, the receiving chamber may have a cylindrical sidewall 52 and a floor or bottom wall 54. A rotatable shaft 62 driveable by the drive 180, runs front to back through the chamber 50 and operates a gearbox 64 at the central axis of the chamber 50 to drive a downwardly extending shaft 66 carrying a pair of outwardly (radially of the chamber 50 where it is cylindrical) extending stirring arms 68 which lie just above the bottom wall 54 of the chamber 50.

The stirring arms 68 may be shaped to urge comminuted waste to enter the dewaterer. As an example, the driven stirring member may have blades having a chord which is inclined to the horizontal with the leading edge of each blade being above its trailing edge.

Dewaterer and Compressor

The bottom wall 54 of the receiving chamber 50 has a hemi-cylindrical bulge 56 extending across its width (right to left in FIG. 3) at the top of which is an opening 58 (which may be rectangular).

Below chamber 50 there runs, extending rearwardly (to the left in FIG. 3), a first, low pressure stage 60a of a two stage first Archimedean screw conveyor 60. The first, low pressure stage 60*a* comprises a screw member running in a cylindrical housing which has a top opening 59 therein mated to the rectangular opening 58. A cylindrical housing (or shroud) 600 of the first stage of the screw conveyor is perforated with holes 63 on its underside to allow water to be squeezed out of the waste to dewater the waste. In this example the holes are 2 mm holes although other size holes may be used provided that they enable water to exit but not the waste. To the right (in FIG. 3) of the perforated region of the cylindrical housing of the first stage of the screw conveyor and of the top opening 59 therein is a downward facing opening 61 (which in an example may be rectangular) in the housing. This opening 61 is for use during a cleaning operation and is for allowing egress of material in the conveyor when the screw is run in reverse to drive such material towards the opening 61.

The pitch, outer diameter and core diameter of this first, low pressure stage 60*a* of the first Archimedean screw conveyor 60 may each be constant, so that the waste is not substantially compressed at this point. Optionally, however, the pitch may decrease progressively and/or the diameter of the core may increase progressively to impose a greater degree of compression, although the main purpose of this stage is dewatering rather than compression.

Rearward (to the left in FIG. 3) of the chamber 50, a second stage 60B of the screw conveyor 60 is formed as a high-pressure region. In the first stage 60A of the screw conveyor, the screw comprises a constant pitch helical flight on a constant diameter core. In the second stage 60B, the screw comprises a core of progressively expanding (rearwardly) cross section bearing a constant pitch helical screw flight so as to facilitate compression. In a domestic sized unit, the constant diameter core of the first stage of the screw conveyor may be for instance 120 mm in length whilst in the second stage of the screw conveyor, the progressively expanding core may have a length of 250 mm. The core may have a diameter of 15 mm over its constant diameter part, expanding in the second section to 30 mm. The overall diameter of the screw may be 35 mm. The high-pressure region may have a taper and operational speed such as to produce a pressure of 4,000 bar (58,000 psi). The moisture or water content at this stage may be 25% by weight.

In the second stage 60B of the screw conveyor, the screw is contained within a shroud 70 which may be opened for cleaning purposes. FIG. 5 shows an example of the shroud 70, in an open position. As shown in FIG. 5, the shroud 70 is formed by two hollow hemi-cylindrical shells 72, 74 carried by respective arms 76 which are hinged for movement about a shaft 78 extending parallel to and above the shroud 70. The shells are moveable between a first, closed, position in which they form the shroud 70 enclosing the screw, and a second position shown in FIG. 5 in which the screw is accessible for cleaning. In an intermediate position, not shown, pressure within the shroud is released and any trapped solid items can be downwardly expelled as described in more detail below.

The hinged shells 72, 74 thus provide access for cleaning by cleaning fluid and may also allow for relief of excess pressure caused by an incompressible object inadvertently passing through this part of the machine.

The shroud 70 of the second stage of the screw conveyor is itself contained within a cylindrical washing chamber 170 to which cleaning fluid is pumped as described below.

Powder Receiver

In this example, the powder receiver is a powder hopper 80 disposed to the rear of the rear wall of the hopper 14. The powder hopper 80 has at its top opening a user-openable door 82, which may be, for example, hinged or sliding in action. From the base of the powder hopper 80 extends downwardly a powder chute 84 which communicates with an upwardly facing opening in a shroud of a second Archimedean screw conveyor 86.

Mixer

Behind the second stage of the first screw conveyor lies a cylindrical mixing chamber 88 into the top of which the second screw conveyor 86 empties via a port 90 so that dewatered, comminuted food waste from the first screw conveyor 60 and the powder from the hopper 80 meet and are mixed by a large diameter mixing screw 89 and conveyed to the rear of the mixing chamber.

Outlet

Mixed waste exits the mixing chamber 88 via a port 92 in the base thereof and falls into a tapering chute 94 from which it is driven by a fourth screw conveyor 96 forwardly (to the right in FIG. 3) to exit via a mouth 98 into a bag 101 retained in a bag tray 100 which can be removed from the apparatus by sliding out of a front of the housing 10. The tray 100 may have a heat conductive (e.g. metal) base which may assist the drying process.

Cleaning

Below the first stage of the first screw conveyor there is a filter tray 102 having over its top opening a mesh filter 104 which may for example be made of wire or plastics. The tray 102 is slideable out of the front of the apparatus for cleaning.

Provision is made for a cleaning cycle for washing through those parts of the apparatus that encounter wet food waste whilst keeping dry the parts of the apparatus through which pass the powder from hopper 80. Thus, the apparatus may conceptually be divided into a 'wet part' and a 'dry part'. The 'dry part' is the part through which the powder passes and comprises the powder hopper 80, the screw conveyor 86, the mixing chamber 88, and the path therefrom to the collecting bag 101. The 'wet part' comprises the whole path of the food waste up to its mixing with the powder. Only the 'wet part' is washed in the cleaning cycle.

A water inlet is provided at 110 to a cleaning pump 112 from which water is directed to a hot water cylinder 150 provided at the rear of the apparatus adjacent the mixing chamber 88. An electrical heater element 152 extends within the hot water cylinder 150. Pipework communicates the hot water cylinder with the spray jets 120 above the sidewalls of the hopper 14 and with the washing chamber 170 that surrounds the conveyor shroud 70. Washing chamber 170 drains into the filter 104 through pipework to a drain hole 170*a* that exits above the filter 104. A drain 172 extends from the filter tray 102 rearwardly to a discharge sand filter 174 connected via a drain pump 162 to a discharge outlet 176 to be connected to a foul water drainage system. Thus, all the water used in a cleaning cycle ultimately drains via drain 172 to the discharge filter 174 and is ejected by the drain pump 162.

Between the high pressure section 60B of the first screw conveyor within shroud 70 and the mixing chamber 88 is positioned a rotary ball valve 166 operated by a rotatable shaft 168. The valve is operable as a ball valve to prevent cleaning water progressing rearwardly into the dry section of the apparatus (mixing chamber 88).

A cleaning solution container 178 is provided which also has a user openable cover 178*a*. This feeds cleaning solution to the feed of hot water exiting from the hot water cylinder 150 as it passes through a Venturi 148.

Control System

Components of the apparatus are driven by a motor drive mechanism of a control drive system 180. The motor drive mechanism comprises an electric motor coupled to drive the various components via belt drive and gear drive arrangements, as appropriate. In the interests of clarity, these are not shown in FIG. 3. As an example, the drive mechanism may have a gearing box with an output shaft which drives a first of the knife or blade bearing shafts 44 and 46, drive being communicated to the other shaft 46 by meshing pinions connecting the two shafts for contra-rotation. The screw conveyors 60, 86, 96 and the mixing chamber screw 89 may be driven by belt drives coupled to the motor. The gearbox 64 is coupled via shaft 62 to the drive motor. Thus, as an example, an internally toothed drive belt (not shown) may connect a sprocket at the opposite end of one of the shafts 44 and 46 to a sprocket on the forward end of the screw member of the first screw conveyor whilst another drive belt may take power from the same gearbox to the mixing chamber screw in mixing chamber 88 and to the fourth screw conveyor 96.

In the interests of simplicity, the electrical couplings and sensors of the control system are not shown in FIG. 3. Various sensors are provided for detecting whether supplies of powder and cleaning fluid are present and whether the bag in tray 100 is full, and whether the various trays and doors are closed properly. Indicator lights may be provided to inform the user of the status reported by some or all of these sensors. User input devices (switches and/or buttons) for controlling operation of the apparatus are also not shown. It will of course be appreciated that the timing of operation of the components coupled to the motor drive mechanism is controlled by the gearing ratios and belt drive arrangements and that the control system is arranged to ensure that the motor is not operated unless the doors are shut and the hoppers contain sufficient material (waste or powder as the case may be). The control system also may stop operation of the motor and other components in the event of detection (for example by undue load on the motor) of a foreign or unduly large object (such as a piece of cutlery or very large bone) in the screw conveyor 60. In such circumstances, the control system also may be designed to automatically reverse operation of the screw conveyor to eject the unwanted object or to alert a user to enable the user to activate a user input device to reverse operation of the screw conveyor.

The control system may cause a cleaning cycle to be carried out automatically or in response to a user activating a user input device that controls initiation of a cleaning cycle.

The control system may comprise an electromechanical control system or a microprocessor or computer control system, in a manner similar to that of a washing machine or dishwasher.

Operation of the Apparatus

In use, the apparatus functions as follows, under the control of the control system and the user. In a first stage, food waste (as explained above) is placed by the user into the hopper 14 and the hopper door 12 is closed. The waste may be stored there temporarily as desired, with further waste being added from time to time. Powder (as explained above) is charged into the powder hopper 80, and cleaning fluid (as explained above) is charged into the cleaning fluid container 178.

When desired, the apparatus is activated by the user. Provided that all safety checks are met, including sensing that the food waste door 12 is closed, the motor 180 drives the hopper sidewalls 22 to pivot to their open position, dropping food waste onto the now rotating knife shafts 44, 46.

In the second stage of the process, the food waste is chopped, shredded and ground by the knife shafts 44, 46 and the bladed wheels 48 they carry and is reduced to particles of about 2 mm in size. Even quite large bones are easily dealt with, but if some object such as cutlery is dropped in by accident, this is sensed as excessive resistance to movement of the main drive motor. In this event, overload of the motor triggers the motor to stop and to reverse. The blades are reversed by reversal of the motor to expel the article, an alarm is given by sound or visible indication and the process is halted. The item can be retrieved from the filter tray 102 having been carried out over the side of the bladed wheels 48 onto the filter 104.

The comminuted waste is dragged down through the nip provided by the bladed shafts 44 and falls into the waste receiving chamber 50 below, where the stirring arms 68 guide the waste through the outlet opening 58 to enter the first, low pressure, section of the first screw conveyor 60.

In the third stage, the waste is driven rearwardly between the screw of the first low pressure section 60A of the first screw conveyor 60 and its covering shroud and is dewatered and somewhat compressed, with liquid exuded from the waste passing through the apertures 63 in the shroud to fall into the filter tray 102 below via the filter 104. Depending on the original water content of the waste, typically 50-70% of the weight of the waste is lost here as liquid water.

From there, the waste is driven rearwardly into the second, high pressure, stage 60B of the first screw conveyor 60. As set out above, in the second stage, the cross-sectional area of the screw conveyor core increases, for example continuously, toward the mixing chamber (alternatively or additionally the pitch of the screw conveyor decreases, for example continuously, toward the mixing chamber). This causes compression of the waste and, as a result, the waste is put under high pressure. The pressure in this section can amount to 25 MPa-35 MPa or higher, for example 400 MPa (Mega Pascal). This second, high pressure, section 60b may generate heat which may assist in the drying of the waste. This heat could also be utilised to help heat the cleaning water.

The shells 72 and 74 surrounding the screw of the conveyor are of course closed at this stage, but they can be forced open slightly if excessive pressure builds up in the conveyor, e.g. if a non-compressible body makes it this far into the process. If for instance a chip of bone or the like too large to pass through this section with the shells fully closed enters this part of the conveyor, opening the shells by say 1 mm will allow it to pass through into the mixing chamber 88 by providing a little extra clearance.

The comminuted waste now has a paste-like consistency and a water or moisture content of typically about 30% by weight, preferably 25% by weight, as it emerges through valve 160 into the mixing chamber 88 into which powder is delivered from the hopper 80. The powder contained in hopper 80 may be any of those mentioned above. As an example, the powder may be a mixture of Portland cement, quick lime and fine silica of the kind conventionally sold as glass block mortar, with an optional addition of a fungicide such as copper sulphate. The waste may be heated during the mixing process by hot water in the hot water cylinder 150.

The mixture of powder and food waste is sliced and mixed in a fifth stage of the process by the thread of the mixing screw 89 in the mixing chamber 88 and is progressively forced rearwards before, in a sixth stage of the process, being forced down through the chute 94, along the last screw conveyor 96, and into a bag, suitably of paper, in the bag tray 100. At this point, the waste and powder will have formed particles of around 1-2 mm in size which are quite dry and which progressively set to become a flowable coarse powder. Should the bag fill part way through the process, a full bag sensor (not shown) will cause the control system to stop operation of the apparatus and to alert a user to allow a replacement bag to be fitted.

The bag containing the processed waste can be set aside for future disposal as its contents are quite odourless and are unaffected by becoming wet. The processed waste can therefore be stored without difficulty to await collection.

At the end of the working cycle, when all the waste from the waste hopper 12 has been treated, absence of further waste just upstream of the collection bag is sensed by a sensor (not shown) such as a paddle switch or the like.

Where the waste food hopper 14 has a capacity similar to a large loaf of bread then typically a full hopper of waste may be processed in about 60 seconds.

The control system may cause a wash cycle to be commenced a set time after the end of the working cycle. Of course, if preferred this automatic feature can be omitted and the wash cycle can be manually initiated.

In the wash cycle, water from the hot water tank 150 containing entrained cleaning fluid from the container 178 is pumped to jets 120 in the lid or door 12 of the hopper 14 and the control system causes the pivoting sidewalls 22 to open and shut several times (e.g. three times) to allow their undersides to be cleaned. The control system keeps the pivoting sidewalls 22 remain open to allow cleaning of the knife blades on the wheels 48 and the wet food processing zones below them.

The control system will also have caused shells 72, 74 of the shroud in the high-pressure conveyor zone to be opened to enable water to be supplied for cleaning into the washing cylinder 170. It will of course be appreciated that, before a wash cycle is commenced, the control system causes valve 160 (which may be a rotary ball valve) to close to prevent water passing into the 'dry part' of the apparatus. As show in FIG. 3, the cleaning water drains through drain hole 170a into the filter tray 102 above the filter 104. Although not shown in FIG. 3, the control system may cause the cleaning water to be recirculated from the filter tray 102 before being pumped out by the drain pump and then cause clean water to be pumped through the 'wet part' to complete the cleaning cycle.

The control system ensures that user operable lids are locked down during the cleaning process but are released at its end and the valve 160 opened so that the apparatus is then ready again for use. The whole cleaning cycle may last only about 1 minute 40 seconds.

The described apparatus is suitable for installation in a conventional domestic or commercial kitchen in the same way as a washing machine or dishwasher. It is capable of receiving and processing not purely food waste, but essentially everything that might normally be left on a plate, including light food packaging such as yoghurt pots and non-edible portions of foods like fruit peelings and cores. Moreover, it is capable of receiving and dealing with poultry carcasses and bones from carved joints. Whilst the apparatus would successfully receive and pass through materials like cardboard packaging or plastics packaging, this is not desirable because such non-biodegradable materials are able to be recycled usefully. Moreover, although they will pass through the apparatus, they will not inherently contain sufficient water to react properly with the powder described above.

One or more of the screw conveyers may be replaced by other transport mechanisms, such as piston arrangements, and, where appropriate, dewatering and compression may be achieved by other means such as a centrifuge arrangement. Other forms of valves, hoppers and closure mechanisms that provide the same or similar functionality may be used. In the example described above, the hopper 14 has pivoting sidewalls, other suitable mechanisms for enabling discharge of waste from a full hopper onto the contra-rotating knife blades may be used, for example a sliding door arrangement. Also the relative positions and orientations of the components need not necessarily be as described above. Also the bag 101 may be replaced with another form of collection mechanism.

Examples

Figure 6:
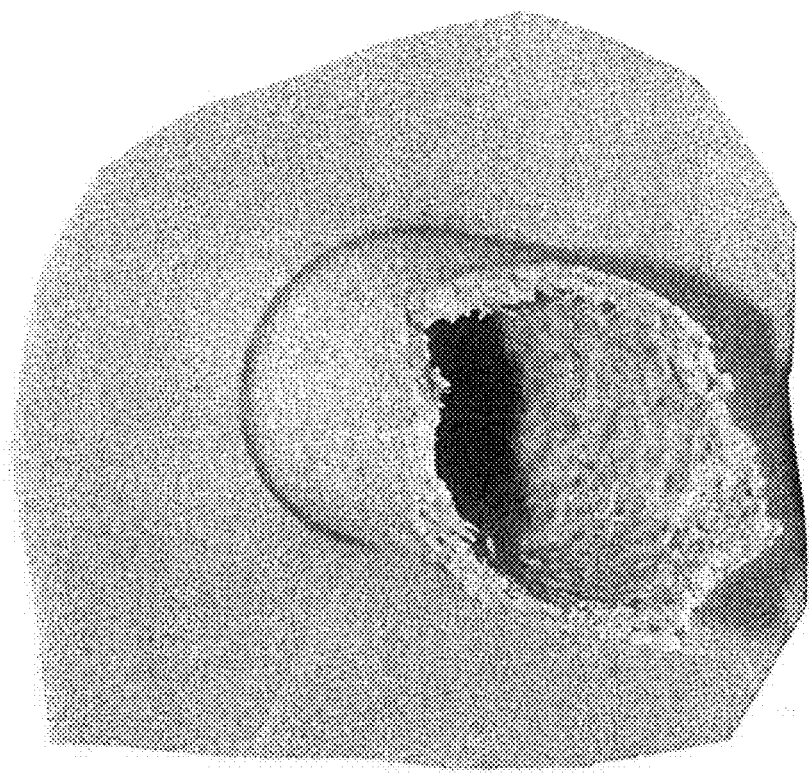
FIG. 6 shows a photograph of a sample of material entering a mixing chamber of apparatus embodying the invention.
Figure 7:
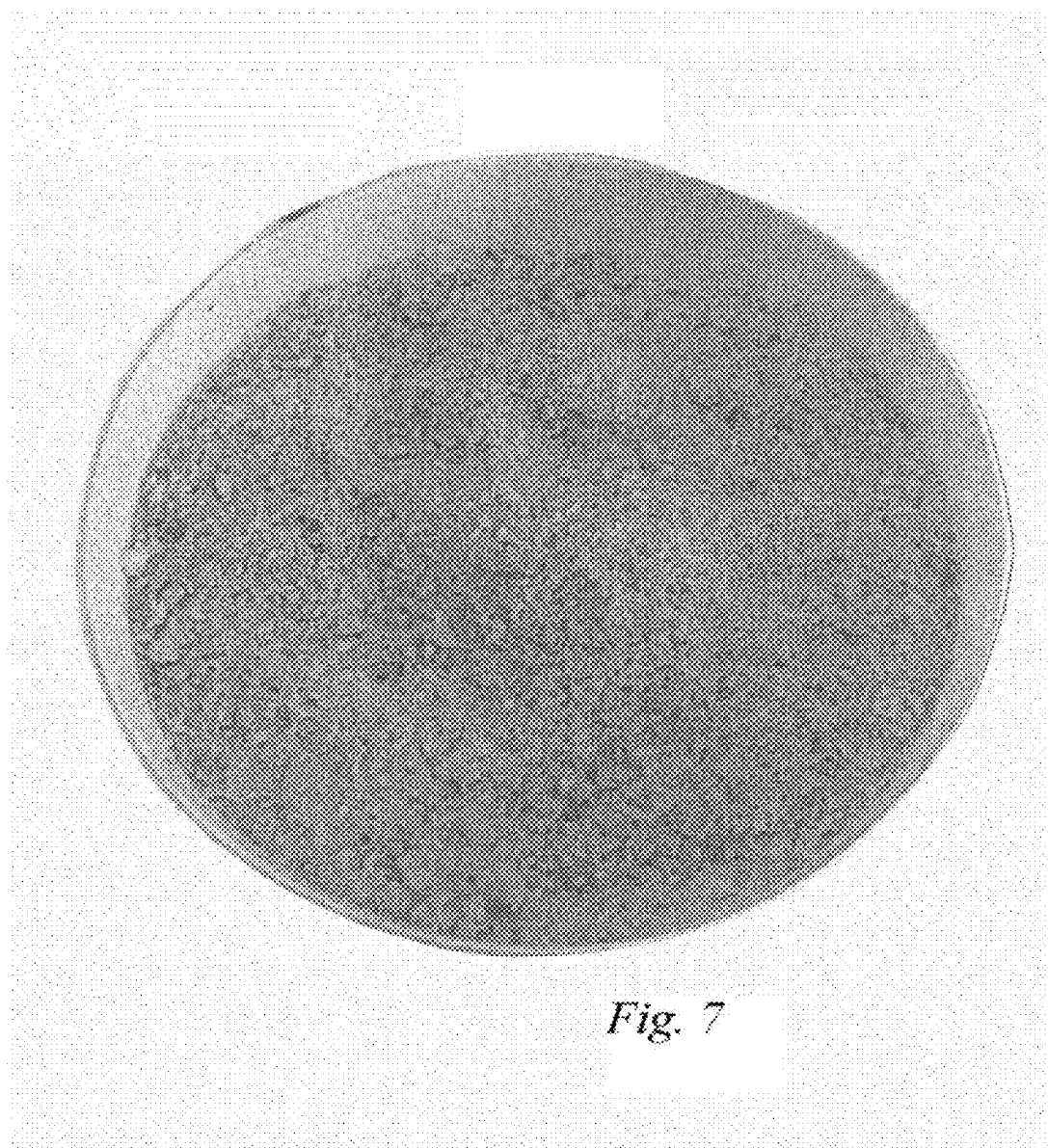
FIG. 7 shows a photograph of a sample of processed waste output by apparatus embodying the invention.

Apparatus embodying the invention has been used to process food waste in the form of, for example, a lamb dinner with potatoes and vegetables and a chicken curry. FIGS. 6, 7 and 8b show processed waste where the waste was a lamb dinner and the proportion of waste food to powder was 25 to 35% by volume waste to powder as described above with the powder being a Portland cement based powder as discussed above. FIG. 6 shows a photograph illustrating the output of the compressor (the second stage of the screw conveyor in the example above), that is the input to the mixing chamber 88 whilst FIG. 7 shows a photograph illustrating the processed output supplied to the bag 101. The waste output by the compressor has a consistency similar to solidified porridge whilst the actual output of the apparatus is a dry granular material that has a consistency similar to that produced by mixing flour, fat and sugar to produce a topping for a fruit crumble or after mixing flour and fat prior to the addition of water during the making of short crust pastry. Typically the final processed waste has a particle size of about 2 mm on average. The colour of the final processed waste product is dependent upon the colour of the "ingredients" (the waste and the powder) but the final processed waste is a dry granular material that is odourless and that can be stored at the site of the kitchen for 4 to 6 weeks or more without the need for refrigeration or cooling, even in summer. Indeed, lifespans of about four months before microbial infection sets in have been achieved.

As described above the drying agent comprises a powder. Drying agents that perhaps would be considered to be granular materials or granulars and may themselves having little or no tendency to clump or which have a slightly larger particle size than perhaps would be usual for a powder may be possibilities and should be considered to fall within the definition of powder as used herein, the requirement being that the powder assists the drying of the comminuted, dewatered and compressed waste and perhaps also its mixing and grinding.

Figure 8:
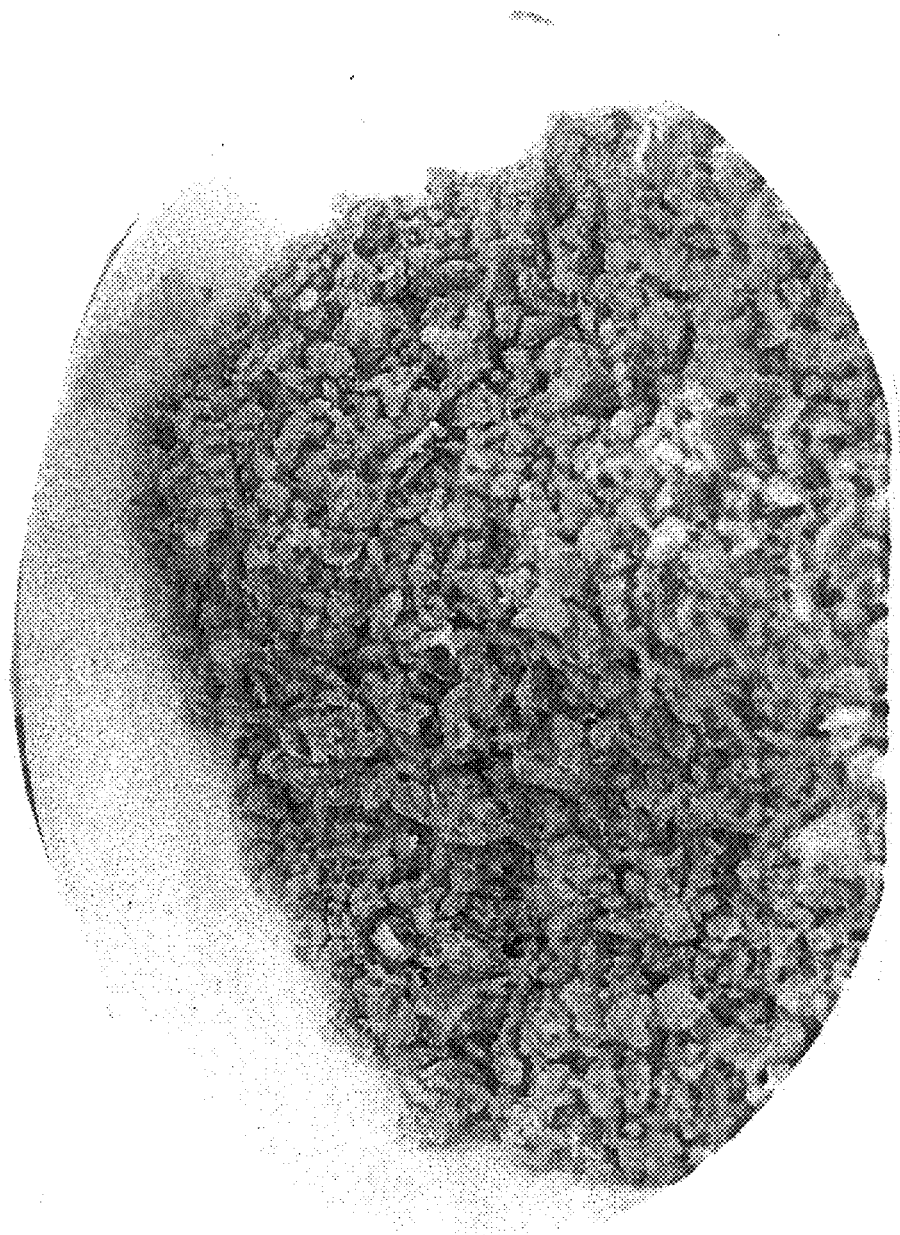
FIG. 8 shows a photograph of a sample of processed waste output by apparatus embodying the invention where the drying agent is omitted from the processing.

The addition of the powder to the comminuted, dewatered and compressed waste significantly assists in the drying and the achievement of the lifespans mentioned above. Where such lifespans are not required, then the powder may be omitted. FIG. 8 shows a photograph illustrating the processed output supplied to the bag 101 when the powder is omitted. It is clear from a comparison of FIGS. 7 and 8 that omission of the powder results in a processed waste product that has a significantly larger particle size, looking more like a spongy granola than crumble topping, this possibly resulting partly from the higher moisture content causing clumping.

In embodiments, as shown in FIG. 3, the second stage 60B of the screw conveyor 60 has a core or shaft having a cross-sectional area which increases in the direction in which the waste is being conveyed (that is towards the mixing chamber 88 in FIG. 3). This outward flaring of the core or shaft in the direction of conveyance of the waste causes the waste to be compressed or compacted against the inner surface of the housing of the second stage 60B as the waste travels towards the mixing chamber 88. This produces an annulus or ring of waste material with the thickness (in a direction transverse to the direction of conveyance of the waste) of the ring or annulus of material decreasing in the direction of conveyance as the waste material becomes more and more compressed or compacted against the inner surface of the housing of the second stage 60B. Thus, as the waste travels along the second stage 60B of the screw conveyor, it is compressed or compacted into a thinner and thinner ring of material.

This compaction or compression results in the ring or annulus of waste being at a very high pressure at the end of the high pressure second stage 60B. In the example given above, this pressure is about 4000 bar (58,000 psi). FIG. 6 shows an example of an annulus or ring of waste being extruded from the second stage 60B. As the annulus or ring of waste is extruded from the second stage 60B, there is a sudden drop in pressure which has been found to kill most of the bacteria present in the waste. This sudden drop in pressure may be achieved by means of a small (of the order of a few millimeters) gap at the end of the second stage 60B. Additionally, or as another possibility, the pressure may be released by the mixer blade 89 of the mixing chamber.

In embodiments, the apparatus is a stand-alone apparatus that may be placed under a kitchen work surface or positioned at a convenient location in a kitchen or other room.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of "having" and/or 'including' rather than to mean necessarily 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

The invention claimed is:

1. Apparatus for processing kitchen waste, the kitchen waste comprising food waste, the apparatus comprising:
    an inlet for receiving the kitchen waste;
    a comminuter to comminute the received waste to provide comminuted waste;
    a dewatering device to dewater the comminuted waste to provide dewatered comminuted waste;
    a compressor to compress the dewatered comminuted waste; and
    an outlet to provide processed waste ready for collection, wherein the inlet has a lid moveable between a closed position and an open position and the inlet communicates with a hopper having an outlet, the hopper outlet communicating with the comminuter by a door mechanism, and wherein the door mechanism and the lid are interlocked such that the door mechanism opens to supply food waste to the comminuter only when the lid is in the closed position and such that the lid is openable to allow a user to add food waste into the hopper only when the door mechanism is closed.

2. Apparatus according to claim 1, further comprising:
    a device to provide a drying agent to be mixed with the compressed waste and a mixer to mix the compressed waste with drying agent so that in use the processed waste is provided as cementitious waste granules.

3. Apparatus according to claim 1, wherein the comminuter comprises at least a pair of contra-rotating driven knife or blade bearing shafts defining a nip through which waste is forced.

4. Apparatus according to claim 1, wherein the dewatering device comprises an Archimedean screw having a housing with apertures for egress of water.

5. Apparatus according to claim 1, wherein the compressor comprises an Archimedean screw having a screw flight and a core and wherein at least one of: the core increases in diameter from an inlet to an outlet of the screw; or the pitch of the screw decreases from the inlet to the outlet.

6. Apparatus according to claim 1, wherein the compressor comprises a conveyor configured to compress waste against a housing of the conveyor so that, as the waste is transported along the conveyor, the waste forms a thinner and thinner annulus of compressed or compacted waste material.

7. Apparatus according to claim 1, wherein the compressor comprises a screw conveyor having a core or shaft that flares outwardly in a direction in which the waste is transported by the screw conveyor, wherein the waste becomes more and more compressed or compacted against a housing of the screw conveyor as it is transported along the screw conveyor.

8. Apparatus according to claim 6, wherein a pressure releasing gap or space follows the compressor conveyor.

9. Apparatus according to claim 1, further comprising a cleaning control device to initiate a cleaning cycle, to pass cleaning liquid through one or more of the compressor, dewatering device and comminuter and to discharge spent cleaning fluid through an outlet drain orifice.

* * * * *